July 30, 1968 W. BETHKE 3,394,822
CONVEYOR

Filed March 2, 1966 2 Sheets-Sheet 2

INVENTOR:
WILLI BETHKE

BY
Michael J. Striker
his ATTORNEY

United States Patent Office 3,394,822
Patented July 30, 1968

3,394,822
CONVEYOR
Willi Bethke, Solingen, Germany, assignor to
Th. Kieserling & Albrecht, Solingen, Germany
Filed Mar. 2, 1966, Ser. No. 531,175
Claims priority, application Germany, Mar. 11, 1965,
K 55,513
14 Claims. (Cl. 214—1)

ABSTRACT OF THE DISCLOSURE

A conveyor for elongated workpieces such as pipes or the like in which a plurality of spaced and aligned guide members defining an elongated path along which a workpiece can move lengthwise alternate with a plurality of supporting means having upper guide faces extending from the region of the aforementioned path downwardly inclined transverse thereto at an elevation below said path, and in which at least part of each guide member may move downwardly to an elevation below said guide faces so that an elongated workpiece on said guide members will be received by said guide faces to slide downwardly thereon in direction transverse to the path.

---

Figure 1:
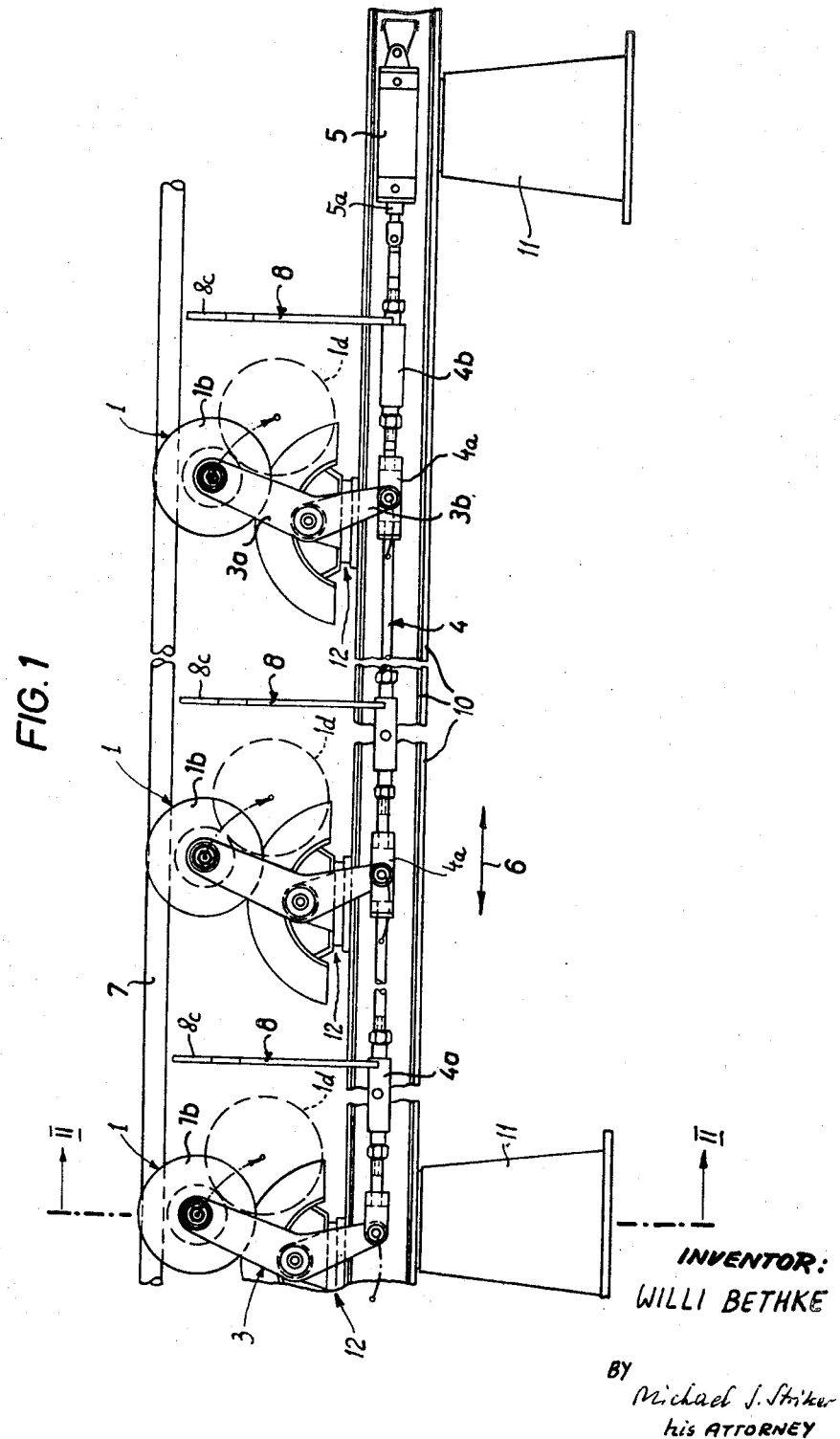

The present invention relates to conveyors in general, and more particularly to improvements in conveyors which may be utilized to guide tubes, pipes, solid rods and similar elongated metallic or nonmetallic workpieces while the workpieces move lengthwise, for example, from a welding or shaving machine to storage or to another processing station. Still more particularly, the invention relates to improvements in conveyors which can change the direction of movement of tubes and analogous elongated workpieces so that a workpiece which has moved lengthwise may be deflected to move sideways.

It is already known to advance elongated workpieces by means of conveyors which can shift such workpieces sideways or which can alter their positions so that a workpiece can change the direction of its movement from an axial to a transverse movement. For example, it is known to guide elongated tubes by means of star wheels which resemble turnstiles and are rotatable about an axis which is parallel to the path of a workpiece. It is also known to support and to guide tubes or the like by a series of rollers which are swingable about a common axis extending in parallellism with the axis of the workpiece to dump the workpiece sideways. A serious drawback of all such conventional conveyors is that each of their work-engaging components must be displaced in its entirety whenever the direction of movement of a workpiece must be changed from a lengthwise to a sidewise movement. The guides for a relatively heavy workpiece must be strong and bulky so that the displacing means which moves such guide members consumes much energy. Also, heavy-duty bearings must be used to insure that the wear on the guide members remains within permissible limits.

Accordingly, it is an important object of the present invention to provide a relatively simple, compact and lightweight conveyor for elongated tubular and/or solid rod-shaped workpieces and to construct and assemble the conveyor in such a way that a workpiece which moves lengthwise may be caused to move sideways without necessitating bodily displacement of all components of guide members which support, guide and, if desired, transmit motion to workpieces.

Another object of the invention is to provide a conveyor of the just outlined characteristics which can discharge a workpiece which moves lengthwise in such a way that the workpiece moves to the one or to the other side of its normal path.

A further object of the invention is to provide improved guide members which may be utilized in the above outlined conveyor.

An additional object of the invention is to provide a novel displacing unit which may be utilized to operate the components of such guide members.

Still another object of the invention is to provide the displacing unit with very simple adjusting devices which can effect changes in the position of individual guide members or which can simultaneously adjust the position of all guide members.

An additional object of the instant invention is to provide a conveyor which can be readily installed in or combined with many present known machines for treating tubes, pipes, solid rods and similar elongated metallic or nonmetallic workpieces.

A further object of the invention is to provide the improved conveyor with very simple supporting and orienting devices which can guide and support a workpiece during sidewise movement away from its normal path.

Another object of the invention is to provide a conveyor wherein the workpieces are guided and supported in such a way that, as soon as a workpiece is free to leave its accustomed path in which it has been advanced lengthwise, the workpiece can travel sideways without necessitating the provision of drive means to effect such sidewise movement.

An ancillary object of the invention is to provide the improved conveyor with guide members which, if desired, can actually advance elongated workpieces lengthwise.

Briefly stated, one feature of my invention resides in the provision of a conveyor for pipes, tubes, rods and other types of elongated workpieces. In its simplest form, the conveyor comprises a plurality of aligned guide members which together define an elongated path wherein a workpiece can move lengthwise. Each guide member comprises a plurality of portions or components at least one of which is movable with reference to the remainder of the respective guide member between a first or operative position in which it cooperates with the remainder of the guide member to guide the workpiece for lengthwise movement along the aforementioned path, and a second position in which the workpiece is free to leave such path by moving transversely or sideways. The conveyor further comprises displacing means for moving the one portion of each guide member between such first and second positions.

In accordance with a presently preferred embodiment of my invention, each guide member is a roller including two mirror symmetrical frustoconical flanges which define between themselves an annular groove for a workpiece which moves lengthwise. Each flange is rockable with reference to the other flange of the respective roller about an axis which is parallel with the roller axis and is normal to and crosses in space the axis of the workpiece. The elongated path may but need not be located in a substantially horizontal plane and the rollers then support the workpiece from below.

The displacing means may comprise a link train which is operatively connected with each flange of each roller and which may receive motion from one or more hydraulic or pneumatic cylinders or analogous prime movers. Such displacing means further comprises turnbuckles or other suitable adjusting devices which can adjust the position of each flange independently of or simultaneously with the other flanges.

The rollers may, but need not, be driven to actually advance the workpiece lengthwise. As a rule, the rollers will be driven by means of belts and pulleys or gear trains if the workpieces are advanced at high speed.

Figure 2:
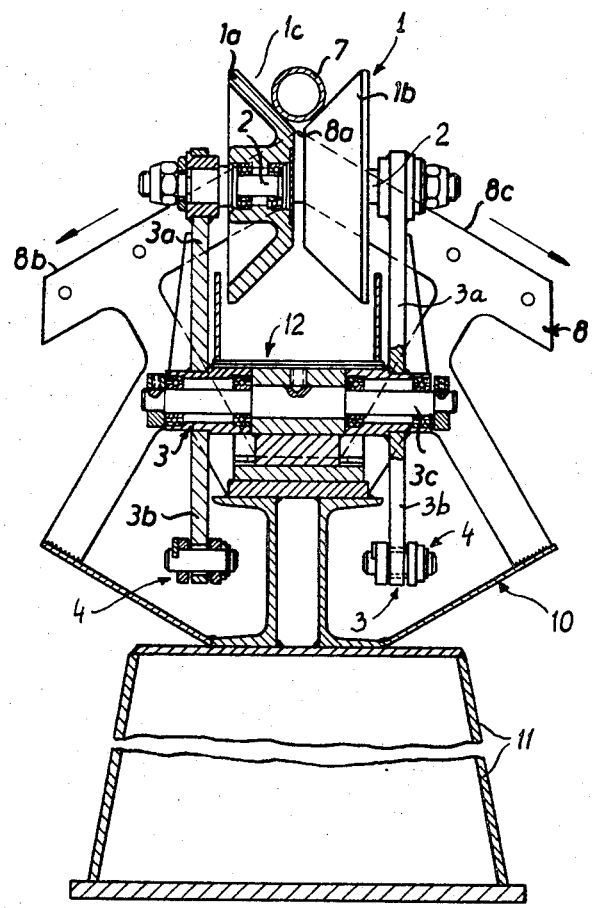

The novel features which are considered as characteristic of the invention are set forth in particular in the appended claims. The improved conveyor itself, however, both as to its construction and its mode of operation, together with additional features and advantages thereof, will be best understood upon perusal of the following detailed description of a specific embodiment with reference to the accompanying drawings, in which:

FIG. 1 is a side elevational view of a conveyor with flanged guide rollers which embodies one form of my invention; and FIG. 2 is an enlarged transverse vertical section substantially as seen in the direction of arrows from the line II—II of FIG. 1.

Referring to the drawings in detail, and first to FIG. 1, there is shown a conveyor which can be utilized to guide and, if necessary, advance elongated workpieces 7 lengthwise and sideways. In the illustrated embodiment, the conveyor is assumed to be utilized for conveying elongated metallic pipes or tubes which are discharged from a welding or shaving machine (not shown) and are transported by the conveyor to storage or to a further processing station. A welding machine may be located to the right and an inspecting or testing machine may be installed to the left of FIG. 1. The workpieces 7 are advanced lengthwise along an elongated path which is located in a substantially horizontal plane and is defined by a series of aligned guide members in the form of rollers 1 each of which is rotatable about a horizontal axis extending at right angles to and crossing in space with the axis of the workpiece. The conveyor may comprise two, three or more guide rollers 1. It includes a base or bed 10 mounted on two or more ground-contacting legs 11. The bed 10 comprises upwardly extending brackets which are indicated by numerals 12, see also FIG. 2, and each such bracket supports the common shaft 3c of two mirror symmetrical bell-crank levers or carriers 3 having arms 3a and 3b. The levers 3 on each shaft 3c are mirror symmetrical with reference to a vertical plane which includes the axis of the workpiece 7. The shafts 3c are normal to the axis of the workpiece and are parallel with the axes of the rollers 1.

Each roller 1 comprises two frustoconical portions or flanges 1a, 1b each of which is mounted on the upper arm 1a of the corresponding lever 3. The two flanges 1a, 1b of each roller 1 normally define between themselves an annular circumferential groove 1c in which a portion of the workpiece 7 moves lengthwise. Each flange is rotatable on a separate shaft 2 and each such flange is rockable with reference to the other flange of the respective guide roller 1 between a first or operative position shown in FIGS. 1 and 2 by solid lines and a second or lower position. The second positions of flanges 1b are indicated in FIG. 1 by broken-line circles 1d. While moving between such operative and lower positions, the flanges 1a or 1b travel in planes which are parallel to the path of the workpiece.

The means for displacing the flanges 1a or 1b to and from the positions 1d comprises two separate displacing units or assemblies each of which includes a hydraulic or pneumatic double-acting cylinder 5 and a link train 4. Since the two assemblies are preferably of identical construction, it suffices to describe the one for the flanges 1b which is shown in FIG. 1. The cylinder 5 of this assembly is articulately connected with the bed 10 and its piston rod 5a is articulately coupled to the adjoining link of the link train 4. The link train 4 further includes a first adjusting device 4b which may be constituted by a conventional turnbuckle and is operated when the user desires to simultaneously change the level of all of the flanges 1b in a manner which will be readily apparent from an observation of FIG. 1. The components of the link train 4 are coupled with the lower arms 3b of the levers 3 for flanges 1b and include a series of additional adjusting members or turnbuckles 4a which may be manipulated by means of suitable tools to individually change the position of flanges 1b with reference to each other and/or with reference to the flanges 1a. In other words, the turnbuckles 4a enable the operator to move the flanges 1b into accurate registry with each other or to move the flange 1b of a selected guide roller 1 into or from accurate alignment with the remaining flanges 1b and with flanges 1a. For example, the operator may wish to move the axes of all shafts 2 into a common plane which is parallel with the axis of the workpiece 7.

The conveyor further comprises a series of supporting devices 8 which alternate with the rollers 1 and are mounted on the base 10. The devices 8 serve to support and to guide the workpiece 7 when the latter is caused to move sideways in response to lowering of the flanges 1a or 1b to the positions 1d. Each supporting device 8 may resemble a roof-shaped body having two downwardly and outwardly inclined portions or sections 8b, 8c which meet in a tip 8a located at the level of apices of the uppermost portions of the grooves 1c. In other words, the tips 8a are located in the aforementioned vertical symmetry plane which includes the axis of the workpiece 7. The portions 8b, 8c may guide the workpiece 7 toward suitable magazines or racks (not shown) which can be installed at the opposite sides of the bed 10 to accommodate workpieces which are placed into temporary storage or which are being subjected to visual inspection by a crew of workmen.

The arrow 6 indicates in FIG. 1 that the workpiece 7 may be moved in a direction to the right or to the left, depending upon the location of the machine or device which discharges the workpieces. The rollers 1 may but need not be driven in a manner not shown in the drawings. In the illustrated embodiment, the conveyor comprises a set of idler rollers. As stated hereinabove, the rollers 1 will be driven by belts and pulleys or by suitable gear trains if the workpieces are advanced at a high speed.

The operation of the conveyor is as follows:

Let it be assumed that the workpieces 7 are advanced seriatim (in a single file) in a direction from the right to the left, as viewed in FIG. 1, and that such workpieces are advanced from a shaving or welding machine on to a testing drum whereon the workpieces are tested for the presence of leaks by means of a hydraulic or pneumatic testing fluid. If the output of the welding or shaving machine exceeds the output of the testing drum, some of the workpieces must be placed into temporary storage by accumulating them in or on racks or magazines located at the opposite sides of the bed 10. This can be achieved by admitting a compressed fluid to one chamber of the cylinder 5 shown in FIG. 1 in such a way that the link train 4 rocks the levers 3 for the flanges 1b in a clockwise direction whereby the flanges 1b move to the positions 1d and permit sidewise movement of workpieces 7 along the inclined portions 8c of the supporting devices 8. The workpieces simply roll by gravity so that they need not be driven in order to leave their normal path defined by the flanges 1a, 1b in the position shown in FIG. 2. If the magazine which is adjacent to the right-hand side of the bed 10, as viewed in FIG. 2, is filled with workpieces, the cylinder 5 is caused to return the flanges 1b to the solid-line positions of FIG. 1 and the operators then cause the other cylinder (not shown) to rock the levers 3 for the flanges 1a so that the flanges 1a move to the lower position 1d and allow the workpieces to roll along the portions 8b of the supporting devices 8 in order to accumulate in the second magazine. The levers 3 for the flanges 1a or 1b may be rocked while a workpiece travels lengthwise.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A conveyor for pipes and other elongated workpieces comprising a plurality of spaced and aligned guide members defining together an elongated path along which a workpiece can move lengthwise; a plurality of supporting means alternating with and respectively arranged in the spaces between said guide members and having upper downwardly inclined guide faces extending from the region of said path transverse to and at an elevation below said path; and displacing means for moving at least part of each guide member out of said elongated path so as to permit the conveyed workpiece to move from the remainder of the respective guide member directly onto said guide faces of the supporting means so that an elongated workpiece on said guide members will be received by said guide faces to slide downwardly thereon in direction transverse to said path.

2. A conveyor as defined in claim 1, wherein each of said guide members comprises two portions at least one of which is movable between an operative position in which it cooperates with the other portion to guide the workpiece along said elongated path and a downwardly displaced position located at an elevation below said guide faces, said displacing means cooperating with said one portion of each guide member for moving said one portion between said positions thereof.

3. A conveyor for pipes and other elongated workpieces comprising a plurality of aligned guide rollers defining together an elongated path along which a workpiece can move lengthwise, each of the rollers having two mirror symmetrical flanges at least one of which is movable with respect to the other in a plane which is substantially parallel to said elongated path between an operative position in which it cooperates with said other flange to guide the workpiece for movement along said elongated path and a second position in which the workpiece is free to leave said elongated path by moving sideways; and a displacing means for moving said one flange of each guide roller between said positions.

4. A conveyor as set forth in claim 3, wherein said rollers are rotatable about first axes which are normal to and cross in space with said elongated path and wherein said one flange is rockable with reference to the other flange of the respective roller about a second axis which is parallel with said first axes.

5. A conveyor as set forth in claim 3, wherein said rollers are idler rollers.

6. A conveyor for pipes and other types of elongated workpieces comprising a plurality of aligned guide rollers defining together a substantially horizontal path, said rollers comprising pairs of flanges defining between themselves grooves in which a workpiece can move lengthwise along said path, each of the flanges of each pair of flanges being rockable with respect to the other flange of each pair about a fixed axis which is parallel to the axis of the respective roller between an operative position in which the flanges define said grooves and a second position in which the respective flange is located at a level below the other flange and in which the workpiece is free to leave said elongated path by moving sideways; and displacing means for moving each of the flanges between said positions.

7. A conveyor as set forth in claim 6, wherein said displacing means comprises adjusting means for moving said flanges independently of each other in planes which are normal to the axes of said rollers.

8. A conveyor as set forth in claim 6, wherein said displacing means comprises adjusting means for simultaneously moving one flange of each roller in a plane which is normal to the axes of said rollers.

9. A conveyor as set forth in claim 6, further comprising a plurality of supporting means for guiding a workpiece which moves sideways in response to movement of one flange of each roller to said second position.

10. A conveyor as set forth in claim 9, wherein each of said supporting means comprises two downwardly and outwardly inclined sections which meet in the common symmetry plane of said grooves.

11. A conveyor as set forth in claim 9, further comprising a lever for each flange of each of said rollers, each of said levers being rockable about one of said fixed axes and each having two arms one of which supports the respective flange and the other of which is coupled to said displacing means.

12. A conveyor for pipes and other types of elongated workpieces comprising a plurality of aligned guide members defining together an elongated path along which a workpiece can move lengthwise, each of said guide members comprises two portions which are mirror symmetrical with respect to a plane including the axis of the workpiece and each of the portions being movable with respect to the other portion in a plane which is parallel to said first mentioned plane between an operative position in which said two portions guide the workpiece along said elongated path and a second position in which the workpiece is free to leave said elongated path by moving sideways; and displacing means for moving said one portion of each guide member between said positions.

13. A conveyor as set forth in claim 12, further comprising supporting means alternating with said guide members and arranged to support workpieces while such workpieces move sideways.

14. A conveyor for pipes and other types of elongated workpieces, comprising a plurality of aligned guide rollers defining together an elongated path, each of said guide rollers having two portions of frustoconical shape, at least one portion is movable with respect to the other between an operative position in which it defines with the other portion an annular groove aligned with the grooves of the other guide rolls so that portions of the working movable lengthwise will be received by said aligned grooves to move along said elongated path, and a second position in which the workpiece is free to leave said elongated path by moving sideways; and displacing means for moving said one portion of each roller between said positions.

References Cited
UNITED STATES PATENTS

| | | |
|---|---|---|
| 2,086,160 | 7/1937 | Gotthardt et al. |
| 3,054,514 | 9/1962 | Riley _____ 214—1 |
| 3,076,562 | 2/1963 | Pitts _____ 214—1 |

FOREIGN PATENTS

| | | |
|---|---|---|
| 1,106,483 | 7/1955 | France. |

ROBERT G. SHERIDAN, *Primary Examiner.*

F. E. WERNER, *Assistant Examiner.*